March 1, 1966  S. L. KOMARIK  3,238,046
PRODUCTION OF INTEGRATED MEAT PRODUCTS
Original Filed April 21, 1964  2 Sheets-Sheet 1
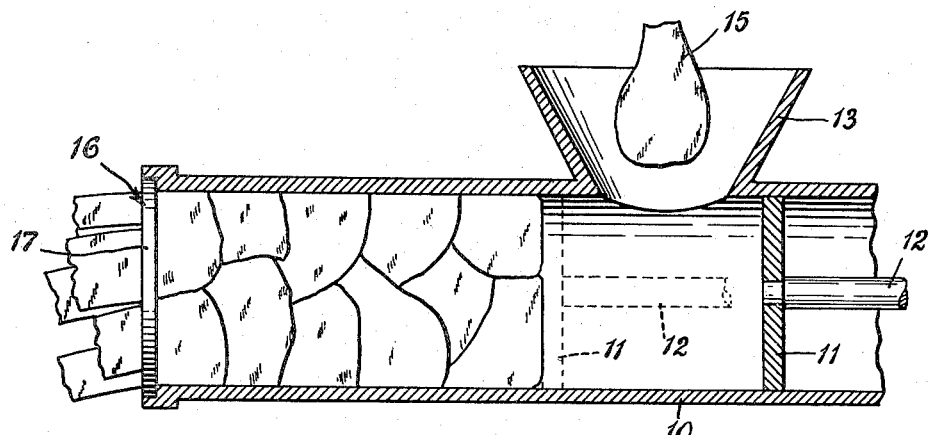
Fig.1
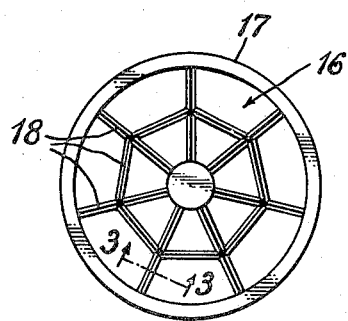
Fig.2
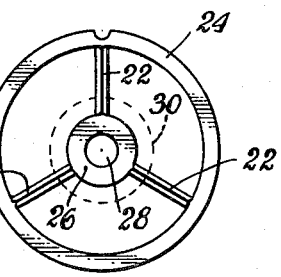
Fig.3
Fig.4
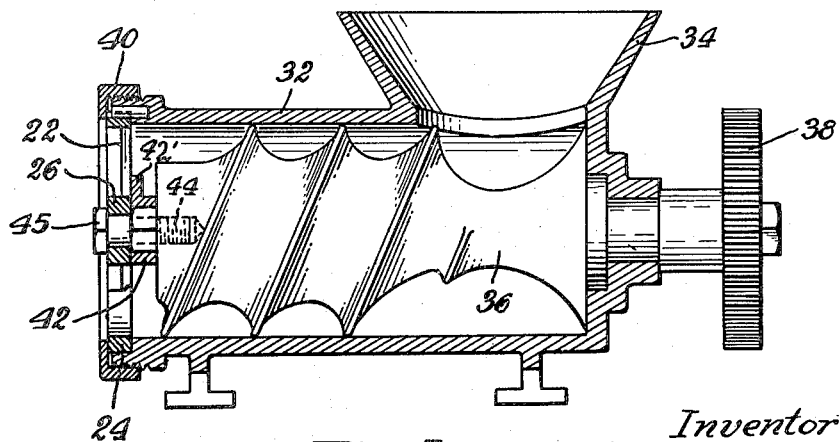
Fig.5
Inventor
Stephan L. Komarik
by W. Bartlett Jones
Attorney Inventor
Stephan L. Komarik
by W. Bartlett Jones,
Attorney

United States Patent Office 3,238,046
Patented Mar. 1, 1966

3,238,046
PRODUCTION OF INTEGRATED MEAT PRODUCTS
Stephan L. Komarik, Chicago, Ill., assignor to The Griffith Laboratories, Inc., Chicago, Ill., a corporation of Illinois
Original application Apr. 21, 1964, Ser. No. 361,514. Divided and this application Aug. 24, 1964, Ser. No. 391,453
8 Claims. (Cl. 99—107)

This application is a division of my copending application Serial No. 361,514, filed April 21, 1964, as a continuation-in part of Serial No. 314,190, filed October 7, 1963, now abandoned.

The present invention relates to processing pieces of raw meat, either fresh or cured, so as to combine or integrate them into a unit by application of heat.

It is known in my earlier U.S. Patent No. 2,224,397 to grind the lean of beef for subjecting it to a cure by mixing with a curing salt composition. This extracts coagulable proteins from the ground meat. Then with or without a second and finer grind, the cured ground meat is packed into bags in molds and cooked, thereby coagulating the proteins as binder for the particles. Then the bagged meat is smoked and dried to effect a "dried beef" product of uniform texture and shape.

It is known as in U.S. Patent No. 3,076,713 to integrate chunks of raw meat weighing at least one-half pound, either fresh or cured, by mechanically working the chunks, and thereby effecting a visual creamy, tacky binding exudate. The chunks are assembled into a formed mass with the creamy exudate at the interfaces. Cooking such a mass activates the exudate to bind the chunks together.

It is also known to use additives as binder for meat pieces, such as flour, starches, gelatin, soybean flour, and especially wheat gluten as described in U.S. No. 3,100,710.

The present invention aims to produce integrated meat pieces consisting essentially of a cooked assembly of randomly arranged whole meat extrudes and integrating binder material therefor at the interface of the extrudes, the binder material including essentially substance of the juices of the meat derived from within the extrudes prior to cooking.

A particular object of the invention is to compress, compact and deform large pieces of whole meat or a mass of whole meat pieces so as to release the juices therein from the holding tissues for use as all or part of integrating binder, and to release the meat from such compression by forcing it through an exit wall formed in part at least of cutting edges and containing large openings for exit of meat in the form of elongated extrudes.

Another object of the invention is randomly to assemble and compact juice-carrying elongated extrudes of whole meat, integrating the assembly having interfacial layers of juice by cooking, or drying as in a smokehouse, or freezing.

The invention may be carried out by compressing whole meat pieces, regardless of size, into a compact mass in a confined space, thereby breaking the natural structure of the meat and releasing juices internally of the mass from the tissues which hold them. These juices are either the natural ones of fresh meat or those of raw meat which has been treated with a salt composition, for example, by having been previously injected with curing salt brine and allowed to cure. The compression is preferably effected by forcing the meat against an exit wall so constructed that it cuts the meat into elongated extrudes, thus releasing the meat from compression, and thus utilizing the surfaces of the extrudes to carry the juices expressed during the compression.

The extruding action is effected through a plurality of orifices so that a plurality of elongated forms of whole meat are produced and discharged. The so-called orifices are openings, which are in part at least peripherally bounded by one or more cutting edges against which compacted meat is forced to cut it and to force an elongated strip through each orifice, which strip may be considered a peripheral slice. Preferably, the exit wall is in the form of a unitary grid of which grid elements against which meat is forced are effective as cutting edges. Preferably, the compacting and the slicing extrusion are effected in one operation by mechanically forcing the compacted meat mass against and past the cutting edges which in part at least bound orifices and which form a resistant exit wall of the confining space in which the mass is compacted.

The slicing extrusion forms new surfaces on which the released juices are held. Therefore, the extrudes of the mass are released from compression as formed and are allowed to move apart from each other to form a new and loose mass of extrudes carrying the expressed juices.

Although the loose mass is then suitable for assembly into a confining form for treatment to bind the pieces together, it may be processed first, as by curing. When the pieces are of fresh meat to be cured, a curing salt composition with or without other additives, such as seasoning, may be added to the loose mass and mixed into it. Among the additives may be supplemental binder, such as those mentioned above, although these are not necessary for permanent integration. When curing salt is so added, the resulting mixture is stored in a chill-room to effect a cure, and later is integrated.

Whether or not additives are employed, it is advantageous mechanically to intermix the discharged extrudes. One result is to redistribute the juices carried by the pieces to effect greater uniformity. Another result is to distribute more uniformly the extrudes which vary in color or texture. This is illustrated by the case wherein cured boned raw hams are compacted and extruded. Hams vary in color and texture, even within a single ham. The smaller the cross-sectional area of the extrudes, the greater is the ultimate uniformity as a result of mixing them.

The process of compacting and extruding may be carried out intermittently or continuously, the latter preferred. Illustrative apparatus is shown in the accompanying drawings, in which:

FIG. 1 is a diagrammatic representation of a piston and cylinder in which meat is fed and compacted.

FIG. 2 is a face view of the grid at the exit end of the cylinder of FIG. 1.

FIG. 3 is a cross-section of a cutting-edge taken on line 3—3 of FIG. 2.

FIG. 4 is a view of another grid to replace the perforated plate of a conventional augur type meat grinder.

FIG. 5 is a cross-sectional view of such a meat grinder with the grid of FIG. 4 in place.

FIG. 6 is a face view of a grid suitable for a large size meat grinder casing, showing a single-bladed cutting rotary knife which moves over and in contact with the face of the grid.

FIG. 7 is a cross-section of a cutting spoke taken on line 7—7 of FIG. 6.

FIG. 9 is a face view of the knife blade of FIG. 8 looking to the left in FIG. 8.

FIG. 10 is an edge view of the rotary knife of FIG. 9.

Figure 8:
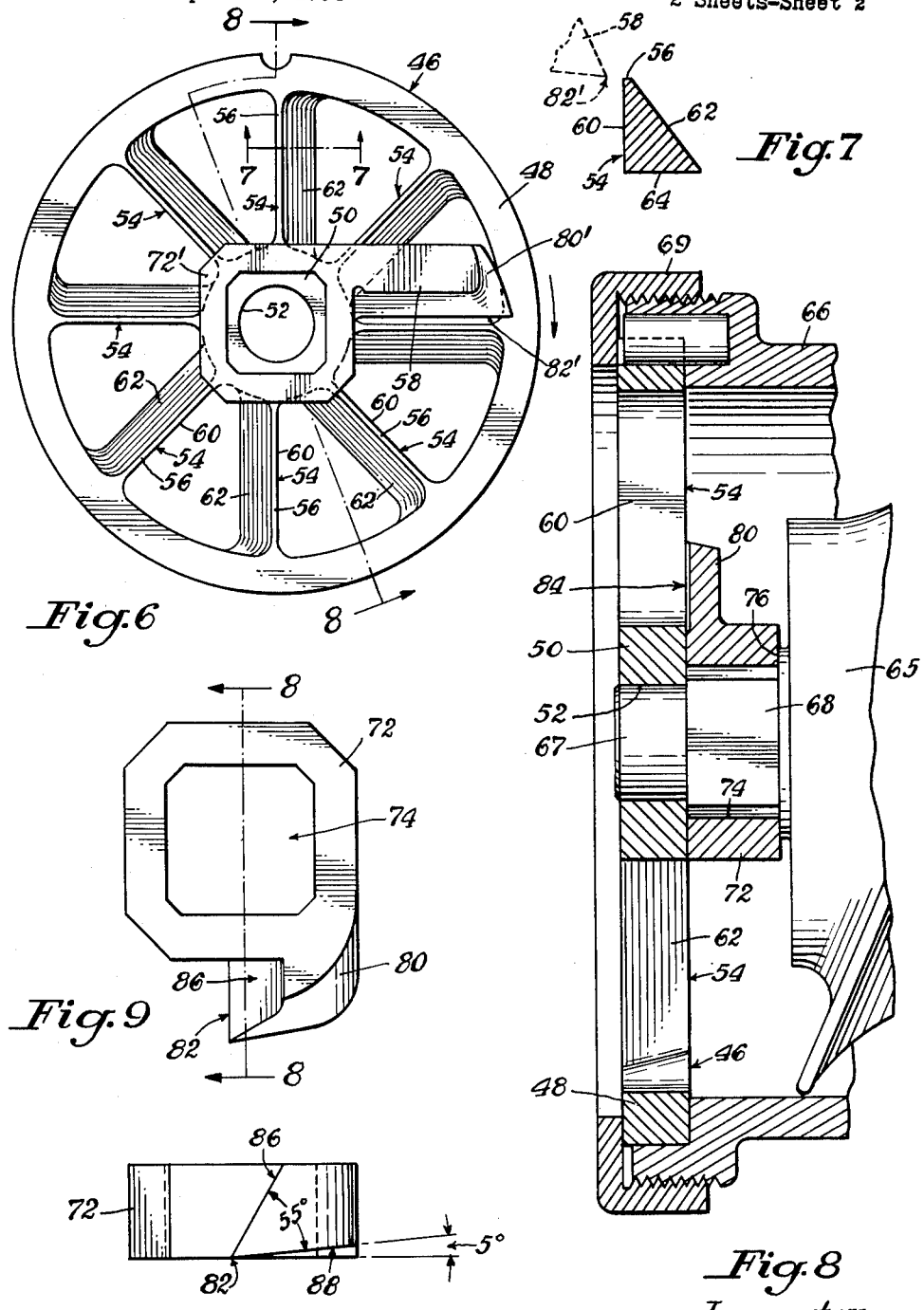
FIG. 8 is a cross-sectional view of the grid taken on line 8—8 of FIG. 6 showing in addition its mounting on the augur in a large meat grinder, and its association with a modified rotary knife blade, which latter is shown in cross-section taken on line 8—8 of FIG. 9.

FIG. 1 shows a cylinder 10 with piston 11 on piston rod 12. A head of the withdrawn position of the piston is a feeding hopper 13 through which to feed meat pieces, for example, boned cured raw hams 15 to be compacted in the cylinder by the piston. At the end of the cylinder 10 there is an exit grid 16 with a circular rim 17 around a spider-web arrangement of knife-edges 18 facing the on-coming meat. For adequate strength these are formed as shown in FIG. 3 as strong rectangular ribs 19 topped by equilateral triangular portions 20 providing the knife-edges 18. The grid has a sufficient number of knife-edges effectively to oppose the pressure of the meat and to build up the compacting pressure to release the juices in the compacted mass.

The irregular shapes of the fed pieces 15 are altered by twisting and bending as the cylinder becomes filled with the meat. Each thrust of the piston slices the meat into peripheral slices as extrudes mostly of cross-section corresponding to the open areas of the grid 16. As the extrudes fall away, the juices released within the meat collect on the surfaces.

The process is preferably carried out continuously with an altered meat grinder of the augur type. In place of a conventional perforated plate and a rotary knife running over the plate, a grid with large open areas and suitable cutting-edges is used. The augur not only compresses the meat but also moves it in a spiral conformation against the grid to be cut thereby into extrudes.

In using the continues process, a conventional augur meat grinder can be modified by removal of the perforated plate and its knife and substituting a grid, such as shown in FIG. 2 or FIG. 4, depending on the size of the outlet, since both large and small diameter augurs are used. In addition to the changes above-mentioned, it has been found advantageous to employ at the discharge end of the augur a single knife running over at least the innermost portions of the grid to cut tendons and strings which tend to gather at this location, and which otherwise wind about the end of the augur.

In one particular grid as shown in FIG. 4 for the discharge orifice of a small modified augur machine, there are three radial knife-edges 22 between rim or frame 24 and a central disk or hub 26 having a central opening 28. The knife-edges 22, for example are 1⅛-inch long defining at the knife-edges three openings of 2.8 sq. inch. Such a grid is adequate to resist the moving meat to release the juices. The knife-edges 22 are coplanar with the plane face of frame 24.

FIG. 5 shows in partial cross-section a conventional meat grinder of which the perforated plate is replaced by the grid of FIG. 4. Also, the hub of the conventional rotary knife which is positioned to run over such perforated plate is retained in its normal position, but its blades are modified by cutting off all the arms except one, and shortening the retained arm so that it runs over only the inner ends of the knife-edges 22 in the region within the dotted circle 30 shown in FIG. 4.

In FIG. 5, a grinder housing 32 has a feed hopper 34 and augur 36 driven by gear 38. The grid is mounted in the end of housing 32 where it is hold by ring cap 40 screwed over the end of the housing. Between the end of augur 36 and the grid is a collar or hub 42 mounted to turn with the augur and carrying a short cutting arm 42′. A bolt shank 44 is threaded into the end of augur 36, with its head 45 holding the central ring 26 of the grid against the knife-carrying collar 42.

The grinder housing shown in FIG. 5 is of a small conventional size which accommodates the grid of FIG. 4 of which the dimensions have been given for the purpose of illustration. In commercial practice, a much larger housing and augur are used so that whole boned hams can be fed to it, in which the grid has more openings for extruding peripheral slices than are shown in FIG. 4.

FIG. 6 shows a grid 46 for a larger type of augur machine, with a circular rim 48 and a central hub 50 with an opening 52 to bear on the end of an augur (later described). A multiplicity of cutting spokes 54 connect the hub to the rim, eight being shown, each of which presents a sharp edge 56 (FIG. 7). The knife-edge 56 is a long narrow flat area for a shearing relation with a rotary knife blade 58 shown in dotted profile as it approaches a spoke. The augur and knife 58 together move the meat which is in a spiral conformation under pressure, not only toward the grid, but also clockwise in FIG. 6, and to the right in FIG. 7. The face 60 of the spoke is substantially at right angles to the plane of the grid, and the face 62 slopes in the direction of the rotating meat at a non-critical angle such as 45° to 50° with the plane of the grid. The wider base 64 gives strength to the grid.

Although the dimensions are not critical, exemplary ones are given to facilitate the explanation. The cutting edges 56 and the faces of rim 48 and hub 50 are coplanar, as shown best in FIG. 8. The rim 48 has an external diameter of 8⅝ inches and an internal diameter of 7.5 inches. The hub 50 has a diameter of 2.5 inches, thus making the cutting edges 56 approximately 2.5 inches long. The grid is ¾-inch thick, making the spoke-base 64 about ⅝-inch wide.

In FIG. 8 the numeral 65 designates the end portion of an augur in a grinder casing 66. The augur terminates in a stub shaft 67 which bears in the grid opening 52. Between the augur portion 65 and the stub shaft 67 is a generally square portion 68 over which fits a one-blade rotary knife, such as shown in FIG. 9, or such as shown in FIG. 6. These differ only in the length of the blade. A threaded ring 69 is screwed into the end of casing 66 to hold the grid in place.

The knife has a collar portion 72 with an opening 74 to receive the generally square portion 68 of the augur 65. The collar fits snugly between the hub 50 of the grid and a shoulder 76 at the end of augur portion 65.

A knife extends from the collar portion 72 as a lug 80 cut to form a knife-edge 82 to run over the face of grid 46 (FIG. 8) and in a radial location to ride over at least the inner ends of the spokes 54 at the region designated 84 in FIG. 8. The inner end of the knife-edge is 1.25 inches from the center, and its length in FIGS. 8 and 9 is 29/32-inch. The knife-edge 82 has an included angle of 55° being formed by a face 86 at an angle of 30° with the axis of rotation, and by a face 88 (FIG. 10) forming a relief angle of 5°. The knife-edge 82 as shown in FIGS. 9 and 10 is slightly to the left of center so that only a narrow tip portion shows partly in cross-section and partly in elevation in FIG. 8. The short-knife of FIG. 8 is used with meat quite deficient in strings. It not only cuts strings tending to wind about the augur, but it slices crosswise into extrudes passing through the orifices, without cutting through the extrudes. The depth of such cutting can be increased by lengthening its blade as shown in the modified knife 58 having knife-edges 82′ in FIG. 6. By making it as long as the spokes 54, it constantly severs the extrudes into more or less uniform lengths.

FIG. 6 shows such a rotary cutter with a long blade in its normal position over the face of the grid 46. It has a hub 72′ and a long lug 80′ like lug 80 in FIG. 9, thus forming long-knife-edge 82′.

A large modified meat grinder such as shown in FIG. 8 operates at about 212 r.p.m. Using the long rotary cutter shown insures that substantially all of the extrudes do not exceed a length generally predetermined by the rate of advancing the meat to the grid.

In operation, the mea pieces are suitably trimmed of fat and tendons and vascular tissue before feeding into the compactor. Such pieces are taken from a chill-room either fresh or cured. After extrusion, the discharged elongated peripheral slices or severed extrudes are limp and can accumulate in a vertical container like a hydraulic mass. The extrudes in such a mass, with or without additives, may easily be intermixed, and if desired, pumped in conventional meat pumps to sausage-stuffing machines or to hoppers for filling forming containers, such as cans to be sealed before cooking.

In the case of beef, the extrudes are mixed with alkali-metal curing salt including essentially alkali-metal nitrite and allowed to cure in a chill-room before forming and cooking. The forming may be effected in one way by forcing the cured hydraulic-like mass into a conventional artificial casing. The filled casing is preferably shaped to a desired cross-section by placing it in a shaping form or cage, for example, one of a shrinkable square cross-section, such as shown in my copending application Serial No. 215,737, now Patent No. 3,202,085 which cage is herein designated as a "grip cage." The caged casing in some cases is then cooked by immersion in water. Then the caged cooked casing is dried and smoked, the cage shrinking with the meat as it dries. Without cooking, the caged encased meat may be smoked and dried thereby to integrate the mass with interfacial binder resulting from the interfacial layers of juice at the interfaces of the compacted extrudes. The resulting product may be sliced as dried beef with clear evidence of whole-meat structure. When some fat is left with the meat it forms visible fat streaks in the slices, thus having a natural appearance distinguishing them from the uniform homogeneous appearance of the slices described in my earlier Patent No. 2,224,397.

It is not necessary to cook, or to smoke and dry the encased meat to integrate the pieces. The juices carried by the extrudes bind the meat when the encased meat is frozen. On thawing, the meat may be sliced without its component pieces falling apart.

The following examples illustrate the invention.

*Example 1*

Fresh pork hams were skinned, defatted, boned and then fed into and compressed in a large modified augur-type meat compresser against a cutting grid to oppose the moving meat, whereby to divide the hams into a plurality of whole meat strips or extrudes moving longitudinally parallel to the augur axis and carrying with them the expressed juices.

The so prepared meat was placed in a mechanical mixer with added ingredients according to the following composition:

| | | |
|---|---|---|
| Meat | pounds__ | 100 |
| Sodium chloride | do____ | 4 |
| Corn syrup solids | do____ | 2 |
| Sodium nitrite | ounce__ | 0.25 |
| Sodium nitrate | do____ | 0.16 |
| Sodium pyrophosphate | ounces__ | 8.0 |

The mass was mixed for 2 minutes, then stuffed into conventional artificial fibrous casings of 4.5-inches diameter. The casings were placed into said shrinkable so-called grip-cage of square cross-section according to my copending application Serial No. 215,737, and allowed to cure for 24 hours at 45° F. Then the caged cured casings were cooked in dry heat in a smokehouse to an internal temperature of 152° F. After 24 hours chill at a temperature 34°–36° F. the hams were sliced thin without breaking or falling apart.

*Example 2*

Fresh beef rounds which consisted of the inside, outside and knuckle pieces, were trimmed from connecting tissues and tendons, then compressed and extruded as in Example 1, carrying with them the expressed juices.

The so prepared meat was compounded for 2 minutes in a mixer to the following composition:

| | | |
|---|---|---|
| Meat | pounds__ | 100 |
| Sodium chloride | pound__ | 1 |
| Roast meat seasoning | ounces__ | 4 |
| Water | pounds__ | 2 |

The salt and seasoning were dissolved into the water and while the mixer was in motion, the solution was added to the meat. The mass under pressure was stuffed into conventional artificial fibrous casings of 4.5 inches diameter, formed into loaf-squares in grip-cages, and chilled overnight at 45° F. The caged casings were then cooked in water at 176° F. until an internal temperature of 165° F. was attained. The cages were then hung at room temperature until the internal temperature until the internal temperature reached 100° F. Then the cages were transferred to chill-room temperature of 45° F. for final chilling. The resulting loaves consist essentially of a plurality of cooked beef pieces in the form of whole meat extrudes integrated by interfacial binder consisting essentially of the dried solids of juices derived from the meat of said extrudes. After 24 hours the loaves were sliced very thin on a commercial slicing machine. Slices were compacted without any evidence of air pockets, and were without separation or breaking into pieces.

*Example 3*

Fresh pork hams were pumped 10% of the green weight with the following curing solution:

| | | |
|---|---|---|
| Sodium chloride | pounds__ | 140 |
| Sodium nitrite | do____ | 1.65 |
| Sodium nitrate | do____ | 1.10 |
| Cane sugar | do____ | 30.00 |
| Sodium tripolyphosphate | do____ | 28.8 |
| Sodium hexametaphosphate | do____ | 3.2 |
| Water | gallons__ | 100 |

They were then cured for 5 days. Then the cured hams were boned, skinned and defatted, and the connecting tissues and tendons removed. The cushion sides were separated from the flank side to separate the dark meat from the light cushion side.

Both sections of the meat were separately compressed and divided into extrudes as in Example 1, carrying with them the expressed juices.

The so prepared flank-side extrudes were directly stuffed into artificial 4.5-inch diameter fibrous casings without putting the meat into a mechanical mixer to be mixed. The casings in grip-cages were cooked in dry heat in a smokehouse until the internal temperature was 152° F.

Then the cushion-side extrudes were mixed in a mechanical mixer for 2 minutes then processed in the same way as the flank-side extrudes.

After cooking, both batches (which were properly marked for identification) were cooked at room temperature for 2 hours and chilled at a temperature of 36° F. for 24 hours. After 24 hours both of the loaves from the cushion and flank sides were thinly sliced into commercial slices and vacuum packaged. Slices were compact and did not come apart during the slicing operation, definitely proving that the mixing operation is not necessary to make the slices bind together after they once are compressed to express the juices and extruded to pieces carrying the juices on their surfaces.

*Example 4*

Example 3 was repeated and the phosphate salts of the curing brine were omitted. The resulting products had exactly the same characteristics as the products in Example 3, showing that the phosphate salt is not necessary to effect binding juices.

Example 5

To manufacture dried beef, the meat used consists of inside, outside and knuckle pieces. The meat at about 32° F. is extruded through the modified augur machine against a cutting grid opposing the moving meat, as in Example 1, to form whole meat extrudes carrying with them the expressed juices. Then the meat is cured with alkali-metal nitrogen curing salt including essentially alkali-metal nitrite.

The whole meat extrudes are compounded in a mechanical mixer for 2 minutes to the following composition:

| | | |
|---|---|---|
| Meat | pounds | 100 |
| Sodium chloride | do | 7 |
| Ice water | do | 4 |
| Sodium nitrate | ounces | 2 |
| Sodium nitrite | ounce | 0.25 |
| Sodium erythorbate | do | 1.0 |

The mixture is held overnight to cure in a cooler not over 32° F. The next day it is mixed for one minute in a vacuum chamber to remove air.

The material is then stuffed immediately into 4.5-inch diameter fibrous casings under pressure, then put into compressing molds or cages consisting of two open grid plates pulled together by springs to flatten the filled casing to a somewhat rectangular form. The molds are then transferred to the cooler at a temperature of 42° F. for 12 to 24 hours to cure.

After the curing period the molds or cages are hung in a smokehouse to dry the meat with controlled humidity to prevent case-hardening of the surface layers by too-fast drying. The following schedule suffices:

| Hours | Dry Bulb, ° F. | Wet Bulb, ° F. | Relative Humidity, percent |
|---|---|---|---|
| 3 (or to Internal Temperature of 129° F.) | 150 | 146 | 90 |
| 1 | 150 | 136 | 68 |
| 1 | 140 | 132 | 47 |
| 1 | 130 | 98 | 35 |
| 18 | 120 | (No humidity control but heavy smoke) | |

Reduce to 110° F. (dry bulb), with no smoke and hold until the meat has lost 40% by shrinkage.

The resulting product is a dried beef ready for slicing and packing. It has a typical analysis as follows:

| | Percent |
|---|---|
| Salt | 10.50 |
| Moisture | 48.50 |
| Fat | 5.25 |

The ice water in the formula above may be omitted thus introducing less water to remove and shortening the drying time. The penetration of curing salt into the meat with or without the use of ice water up to about 5% by weight of the meat is faster and more uniform than heretofore practiced in curing chunks of meat. There are several reasons. The compression breaks down the tissues of the meat creating channels for the penetration. The relatively small and uniform cross-sections of the elongated extrudes induces uniformity and shortens the distances for penetration.

The loaves were sliced thin and packed in glass jars by a commercial packer of dried beef. The slices did not fall apart when handled just as with conventional dried beef. The slices did not show that the loaf was integrated from strips of whole meat bound together.

Example 6

Beef knuckles of canners and cutters grade were stitch-pumped to 12% of their green weight with the following pickle to make a marinated beef:

| | | |
|---|---|---|
| Water | gallons | 25 |
| Sodium chloride | pounds | 31 |
| Protein hydrolysate | pounds | 2 |
| Tenderizer | ounces | 9.5 |
| Tetrasodium pyrophosphate | do | 8 |
| Monosodium glutamate | do | 1.5 |
| Papain | do | 0.0054 |
| Roast beef loaf sauce | gallon | ½ |
| Oleoresin of black pepper on 9 ozs. sodium chloride carrier | ounces | 10 |

Immediately after pumping, the meat was compressed and extruded as in Example 1 to extrudes carrying with them the expressed juices. The material was stuffed immediately into 4.5-inch artificial fibrous casings under pressure, put into grip-cages, and then transferred to the cooler at a temperature of 45° F. for 24 hours to marinate. After the marinating period, the cages were transferred to a cooking tank with a water temperature of 175° F. and cooked to an internal temperature of 165° F. Loaves were removed from the cages, stripped of casings, put on screens, and with a heavy smudge of smoke, were cold-smoked for 45 minutes. Then they were transferred to a chill-room at 36° F. for overnight chill. The loaves were then thinly sliced and vacuum packaged. The slices did not break or fall apart when sliced on a conventional slicing machine.

Example 7

Example 1 was repeated but the meat, after the mechanical mixing, was dumped in truck and cured at a temperature of 45° F. for 24 hours. The next day the cured meat was re-mixed for 2 minutes, stuffed into 6-pound oblong cans, vacuumized and cooked (according to my U.S. Patent No. 2,224,399) to an internal temperature of 152° F. Cans were chilled in cold water to an internal temperature of 100° F. then placed in a chill-room at 34° F. for 24 hours. After the chilling period, the cans were opened and the hams were thinly sliced without breaking or falling apart.

From the foregoing it will be appreciated that the invention may be carried out in numerous ways to produce a variety of meat products, without departing from the spirit and scope of the invention as expressed in the appended claims.

I claim:

1. The method of producing integral forms of meat which comprises releasing juices within a chilled mass of uncooked whole meat by subjecting the meat to compression, converting the compressed meat mass into a plurality of elongated extrudes of whole meat by moving the meat mass while under compression generally in one direction and cutting the meat as it so moves, releasing said extrudes from compression so that the surfaces thereof become exposed and carry the said juices, compacting a mass of said extrudes into a confined form to provide interfacial layers of juice at the interfaces between the resulting pieces of meat, and then processing the confined form to convert said juices to integrating binder, whereby said binder integrates the meat.

2. The method of claim 1 in which the released extrudes are both mechanically intermixed and mixed with additives, whereby to redistribute the juices and the additives over the surfaces thereof and whereby to approach uniformity of meat quality in the integrated meat.

3. The method of claim 1 in which the chilled mass of said uncooked meat contains within it a curing salt brine.

4. The method of claim 1 in which the confined form is cooked to integrate the pieces.

5. The method of producing dried beef comprising slicing a mass of raw whole meat moving in a forward direction under compacting pressure from within a confined space, and thereby forming and discharging a plurality of elongated extrudes of whole meat which carrry at their surfaces meat juices squeezed from the meat by said pressure, mixing said extrudes with curing composition comprising sodium chloride, and alkali-metal nitrogen-curing salt including essentially alkali-metal nitrite, cooling the curing mass for at least 12 hours, stuffing the resulting mass into a casing, forming the stuffed casing into a predetermined elongated shape, cooling the encased meat for 12 to 24 hours to complete the cure, and smoking and drying the encased meat in an atmosphere of decreasing temperatures from the vicinities of 150° F. dry bulb and 146° F. wet bulb.

6. The method of claim 5 in which said curing composition also contains water.

7. The method of claim 5 in which during the smoking and drying the resulting shrinking meat is shaped.

8. The method of claim 5 in which the smoking and drying is carried out in an atmosphere at dry and wet bulb temperatures lowering, respectively, from the vicinities of 150° F. and 146° F. to the vicinity of dry bulb temperature of 120° F. and to the vicinity of uncontrolled humidity below wet bulb temperature of 98° F.

References Cited by the Examiner

UNITED STATES PATENTS

| 2,090,650 | 8/1937 | Vant | 146—187 |
| 2,916,986 | 12/1959 | Lebovitz. | |
| 2,988,452 | 6/1961 | Cameron | 99—194 |
| 3,076,713 | 2/1963 | Maas | 99—107 |
| 3,165,416 | 1/1965 | Sleeth et al. | 99—208 X |

A. LOUIS MONACELL, *Primary Examiner.*

HYMAN LORD, *Examiner.*